Feb. 20, 1923. 1,446,320
A. ROPP
RAIL JOINT SECURING MEANS
Filed Aug. 30, 1922
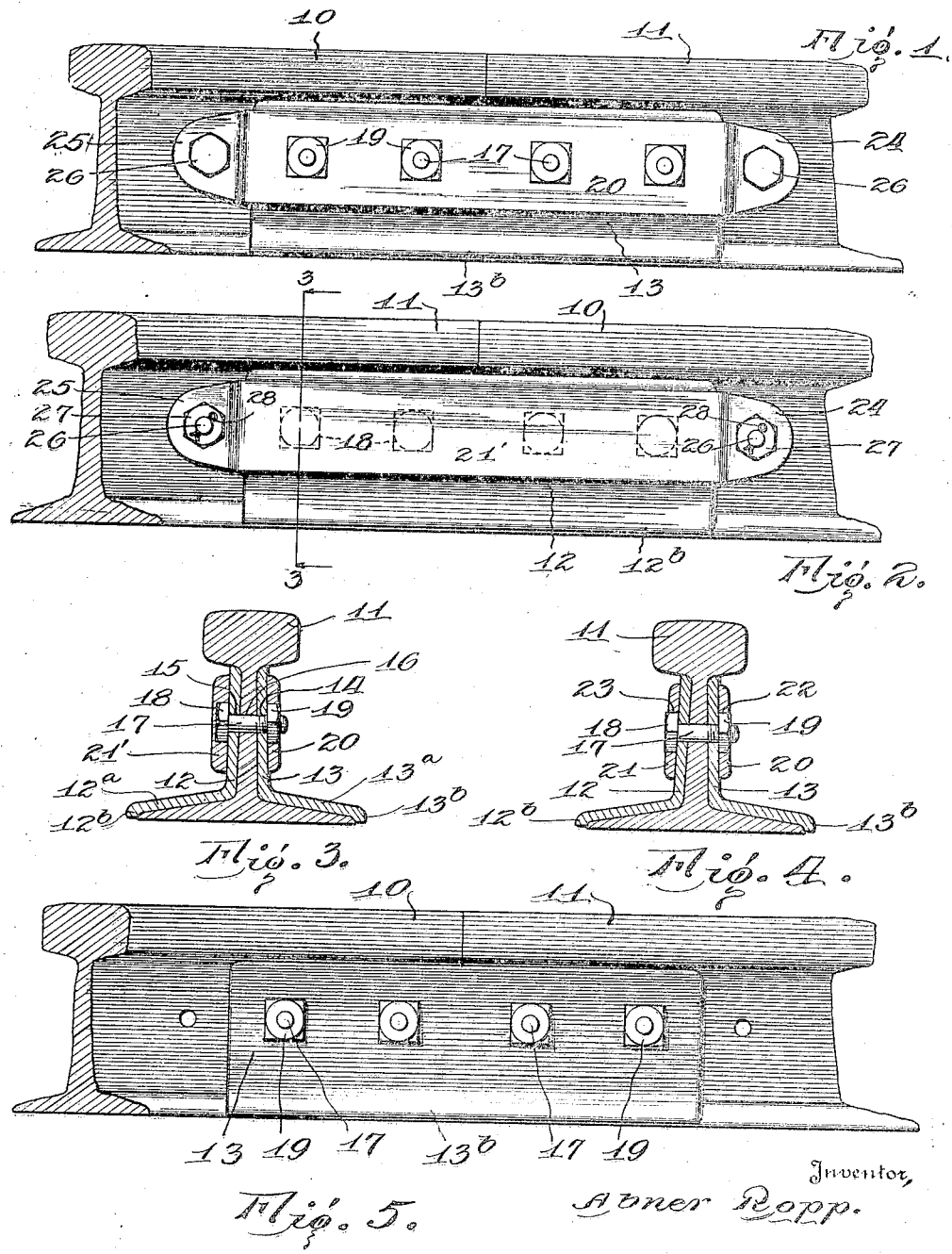
Inventor,
Abner Ropp.
By Walter W. Burns
Attorney Patented Feb. 20, 1923.

1,446,320

UNITED STATES PATENT OFFICE.

ABNER ROPP, OF VANDALIA, ILLINOIS.

RAIL-JOINT SECURING MEANS.

Application filed August 30, 1922. Serial No. 585,117.

*To all whom it may concern:*

Be it known that I, ABNER ROPP, residing at Vandalia, county of Fayette, State of Illinois, a citizen of the United States, have invented certain new and useful Improvements in Rail-Joint Securing Means, of which the following is a specification.

This invention relates to means for securing the ends of rail sections together and particularly to such means, including locking means for the bolts and nuts.

It has been found in railroad work, that with the ordinary fish plate construction of attaching rail sections together, that the movement and pressure from the trains, causes the nuts to work loose, after which if not carefully watched they will shake off, thus permitting the fish plates to drop off with the result that the rail sections come apart and a train may be wrecked.

The primary object of my invention is the provision of an improved rail joining construction which will have means for holding the rails in alignment and also for holding the bolts and nuts in place after they are once secured.

Referring to the drawings where I have illustrated a preferred embodiment of my invention, Fig. 1 is a side elevation of my invention, Fig. 2 is a side elevation on the opposite side from Fig. 1, Fig. 3 is a cross section on the line 3—3 of Fig. 2, Fig. 4 is a cross section of a slightly modified form, Fig. 5 is a side view of the rail joint with the locking plate removed.

Similar reference characters refer to similar parts throughout the drawing.

In the drawing, 10 and 11 designate rail sections, 12 and 13 fish plates having respectively, portions 12ª and 13ª extending out and over the outside edge of the rail as shown at 12ᵇ and 13ᵇ. The main portions of the fish plates 12 and 13 extend on opposite sides of the joint and have openings 15 and 14 respectively registering with the opening 16 in the web of the rail. Bolts 17 having heads 18, pass through these openings 14, 15, 16 and are secured in place by nuts 19. If now no means were provided to hold the nuts and bolts in place, the constant movement caused by the passage of trains would loosen the nuts on the bolts which might result in train wrecks. To obviate this condition, I have provided the reinforcing plates 20 and 21 (Figure 4), these plates being placed on opposite sides of the rail and outside of the fish plates 12, 13. The plates 20 and 21 are identical in shape and have openings 22, 23 to conform to the shape of the nut and bolt head respectively and to thereby prevent the same from turning relatively to each other.

In Figs. 2 and 3 is shown another form of plate 21' wherein the bolt head sets into the plate 21' but does not extend therethrough.

At each end of the plates 20, 21, 21' are offset portions 24, 25 having holes therein to receive the bolts 26 which are secured by the nuts 27. The offset portions 24, 25 lie against the web of the rail and are of a thickness substantially equal to the fish plate, the latter lying between the two offset portions. The nuts 27 are held on the bolts 26 by the split cotter pins 28.

In assembling my construction, the rail sections are brought together after which the fish plates and their bolts are applied in the usual manner, care being taken that the bolt heads and nuts are left in such a position that they will register in the openings of the reinforcing plates 20, 21, 21'. The plates 20, 21 or 20, 21' are now applied and the bolts 26, nuts 27, and split cotter 28 are put in place.

It will be apparent that the plates 20, 21, 21' will hold the fish plate bolts and nuts in place and with its bolts 26 will, because of contact with the bolts of the fish plates, form a reinforcing means and rail stiffener. Before the fish plate bolts and nuts could start to become loose, both of the reinforcing plate bolts would have to become entirely loose.

While I have shown and described embodiments of my invention in detail, I desire to have it understood that I do not limit myself to the exact structure illustrated in the drawing and that modifications and changes may be made without departing from the spirit of my invention and within the scope of the appended claim.

Having described my invention, what I claim is:—

A rail joint comprising two rail sections having abutting ends, fish plates on opposite sides of the rail web, bolts for securing the fish plates to the rail web and reinforcing plates having portions registering respectively with the bolt heads and nuts and extending beyond the fish plates, the rail web and reinforcing plates having registering holes and a bolt for securing the three portions in fixed relation.

In testimony whereof I hereunto affix my signature.

ABNER ROPP.